United States Patent
Guo et al.

(10) Patent No.: US 10,114,277 B2
(45) Date of Patent: Oct. 30, 2018

(54) LIGHT SOURCE SYSTEM WITH A SWITCHING SYSTEM TO GENERATE TWO LIGHT BEAMS HAVING PRESET PROPORTIONS, AND RELATED PROJECTION SYSTEM

(71) Applicant: APPOTRONICS CHINA CORPORATION, Shenzhen (CN)

(72) Inventors: Zuqiang Guo, Shenzhen (CN); Zeqin Wang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/542,244

(22) PCT Filed: Jan. 20, 2016

(86) PCT No.: PCT/CN2016/071432
§ 371 (c)(1),
(2) Date: Jul. 7, 2017

(87) PCT Pub. No.: WO2016/116039
PCT Pub. Date: Jul. 28, 2016

(65) Prior Publication Data
US 2017/0371236 A1 Dec. 28, 2017

(30) Foreign Application Priority Data
Jan. 20, 2015 (CN) .................. 2015 2 0038731 U

(51) Int. Cl.
G03B 21/20 (2006.01)
H04N 9/31 (2006.01)
(Continued)

(52) U.S. Cl.
CPC ....... G03B 21/2053 (2013.01); G02B 27/126 (2013.01); G02B 27/283 (2013.01);
(Continued)

(58) Field of Classification Search
CPC .............. G03B 21/204; G03B 21/2053; G03B 21/2073; G03B 21/2033; G03B 21/2013;
(Continued)

(56) References Cited

U.S. PATENT DOCUMENTS 5,612,753 A * 3/1997 Poradish .............. H04N 9/3108
348/743
7,794,092 B2 9/2010 Drazic et al.
(Continued)

FOREIGN PATENT DOCUMENTS

CN 1981539 A 6/2007
CN 203745789 U 7/2014
(Continued)

OTHER PUBLICATIONS

International Search Report in the parent PCT application No. PCT/CN2016/071432, dated Mar. 23, 2016.
(Continued)

*Primary Examiner* — Bao-Luan Le
(74) *Attorney, Agent, or Firm* — Chen Yoshimura LLP

(57) ABSTRACT

A light source system and a projection system, comprising a light source; a switching system switching light emitted by the light source into at least two light beams having a preset proportion in the manner of time division or light intensity division; a color wheel assembly located in a transmission light path of each light beam of the at least two light beams, with the color wheel assembly generating light having different colors and a preset proportion under the irradiation of each light beam of the at least two light beams, and light of different colors being able to synthesize a projection image after being modulated by a light modulation system, wherein the switching system can adjust the proportion of
(Continued)

the at least two light beams according to the parameters of the projection image, so as to adjust the proportion of the light of different colors.

12 Claims, 5 Drawing Sheets

(51) Int. Cl.
*G03B 33/12* (2006.01)
*G02B 27/28* (2006.01)
*G02B 27/12* (2006.01)

(52) U.S. Cl.
CPC ........... *G03B 21/204* (2013.01); *G03B 33/12* (2013.01); *H04N 9/3164* (2013.01); *H04N 9/3167* (2013.01)

(58) Field of Classification Search
CPC .. H04N 9/3105; H04N 9/3117; H04N 9/3158; H04N 9/3164; H04N 9/3167
See application file for complete search history.

(56) References Cited

U.S. PATENT DOCUMENTS

| | | | | |
|---|---|---|---|---|
| 7,954,960 B2* | 6/2011 | Shirai | ................... | H04N 9/3105 348/743 |
| 8,384,620 B2* | 2/2013 | Brown | ..................... | G09G 3/02 345/31 |
| 8,911,092 B2* | 12/2014 | Fujita | ................... | G03B 21/204 353/31 |
| 9,024,241 B2* | 5/2015 | Wang | ................... | H04N 9/3105 250/208.1 |
| 9,146,453 B2* | 9/2015 | Kasugai | ............... | G03B 21/204 |
| 9,185,372 B2* | 11/2015 | Takahashi | ............ | H04N 9/3114 |
| 2004/0227456 A1* | 11/2004 | Matsui | ................. | H04N 9/3102 313/501 |
| 2007/0040995 A1* | 2/2007 | Tangen | ................ | G09G 3/3413 353/84 |
| 2007/0195275 A1 | 8/2007 | Drazic et al. | | |
| 2009/0141036 A1* | 6/2009 | Shirai | ................... | H04N 9/3105 345/534 |
| 2009/0141188 A1* | 6/2009 | Shirai | ................... | H04N 9/3105 348/743 |
| 2009/0160833 A1* | 6/2009 | Brown | ..................... | G09G 3/02 345/207 |
| 2009/0168174 A1 | 7/2009 | Kim et al. | | |
| 2011/0205498 A1* | 8/2011 | Brown | ..................... | G09G 3/02 353/31 |
| 2012/0133846 A1 | 5/2012 | Ishii | | |
| 2013/0010264 A1* | 1/2013 | Takahashi | ............ | H04N 9/3114 353/20 |
| 2013/0021582 A1* | 1/2013 | Fujita | ................... | G03B 21/204 353/31 |
| 2013/0077055 A1* | 3/2013 | Wang | ................... | H04N 9/3105 353/31 |
| 2015/0002824 A1* | 1/2015 | Kasugai | ............... | G03B 21/204 353/31 |
| 2015/0253653 A1* | 9/2015 | Fujita | ................... | H04N 9/3111 353/31 |

FOREIGN PATENT DOCUMENTS

| | | |
|---|---|---|
| CN | 103974046 A | 8/2014 |
| CN | 104216209 A | 12/2014 |
| CN | 204389864 U | 6/2015 |

OTHER PUBLICATIONS

IPRP in the parent PCT application No. PCT/CN2016/071432, dated Jul. 25, 2017.
Extended European Search Report, dated Jun. 21, 2018 in corresponding application EP 16739786.8.

* cited by examiner

LIGHT SOURCE SYSTEM WITH A SWITCHING SYSTEM TO GENERATE TWO LIGHT BEAMS HAVING PRESET PROPORTIONS, AND RELATED PROJECTION SYSTEM

BACKGROUND OF THE INVENTION

Field of the Invention

This invention relates to projection and display fields, and in particular, it relates to a light source system and a projection system.

Description of Related Art

A projection system according to conventional technology is shown in FIG. 1; the system includes a light source 100, collection lens 101, phosphor color wheel 102, light rod 103, optical relay system 104, spatial light modulation system 105 and projection lens 106. The light source 100 is a semiconductor laser. The phosphor color wheel 102 is a rotating wheel including different color segments. As shown in FIG. 2, the phosphor color wheel 102 includes a first segment R having a red phosphor, a second segment G having a green phosphor, and a third segment B having a blue phosphor.

SUMMARY

Problems to be Solved

In the above system, the semiconductor laser 100 emits an excitation light, and the collecting lens 101 focuses the excitation light onto the phosphor color wheel 102; the first, second and third segments R, G and B of the phosphor color wheel 102 absorb the excitation light to sequentially generate three primary color lights, e.g., red, green and blue. The three primary color lights are homogenized by the light rod 103 and the optical relay system 104 and then input into the spatial light modulation system 105. The spatial light modulation system 105 modulates the light to form an image, which is projected by the projection lens 106 onto a desired plane. In this projection system, by controlling the angular ranges of the phosphor coating of the different color segments of the phosphor color wheel 102, the proportion of the different primary lights can be controlled to achieve a white balance. An example of the angular range of the red phosphor coating of the phosphor color wheel 102 is shown as A in FIG. 2.

During the operation of the above projection system, because the phosphors that generate the different primary color lights age at different speeds, the proportion of the three primary color lights will change over time, and the white balance will drift as a result. However, because the angular ranges of the phosphor coatings of the different color segments of the color wheel are fixed, to re-establish white balance, the color wheel will need to be replaced. This increases the cost and operation difficulty of the projection system.

Technical Solutions

Accordingly, the present invention is directed to a light source system and projection system that solves the problem in conventional projection system which required replacing the color wheel to re-establish white balance, which problem caused the increased cost and operation difficulty.

To achieve the above objects, the present invention provides a light source system, which includes:
 a light source;
 a switching system for switching a light emitted by the light source into at least two light beams having preset proportions using either time division or light intensity division; and
 a color wheel assembly disposed on light paths of the at least two light beams, wherein the color wheel assembly, under illumination of the at least two light beams, generates lights of different colors having preset proportions, wherein the light of different colors are configured to be modulated by a light modulation system and combined to form a projection image;
 wherein the switching system is configured to adjust proportions of the at least two light beams based on parameters obtained from the projection image to adjust the proportions of the lights of different colors.

Preferably, the color wheel assembly includes at least two color wheels, each being disposed on a light path of a different one of the at least two light beams from the switching system and generating a corresponding color light when illuminated by the corresponding light beam; or
 wherein the color wheel assembly includes a single color wheel having at least two concentric color rings disposed in a circumferential direction of the color wheel, each color ring being disposed on a light path of a different one of the at least two light beams from the switching system and generating a corresponding color light when illuminated by the corresponding light beam.

Preferably, the light modulation system includes two light modulators, and wherein the switching system includes:
 a light switch for switching the light emitted by the light source into a first light beam during a first series of time intervals and switching the light emitted by the light source into a second light beam during a second series of time intervals, wherein the first light beam and the second light beam have different polarization states;
 a controller for controlling a duration of the first light beam and a duration of the second light beam, wherein a ratio of the duration of the first light beam and the duration of the second light beam is a preset ratio, and wherein the controller is configured to adjust the preset ratio based on parameters of the projection image.

Preferably, the light modulation system includes three light modulators, and wherein the switching system includes:
 a light switch for switching the light emitted by the light source into a light that simultaneously includes both a first light beam and a second light beam, wherein the first light beam and the second light beam have different polarization states;
 a controller for controlling a deflection angle of the light switch, wherein a ratio of an intensity of the first light beam and an intensity of the second light beam is a preset ratio, and wherein the controller is configured to adjust the preset ratio based on parameters of the projection image.

Preferably, the switching system further includes:
 a beam splitting prism for reflecting the first light beam to a first light path and transmitting the second light beam; and
 a reflector for reflecting the second light beam to a second light path.

Preferably, the at least two color wheels include a first color wheel disposed on the first light path and a second color wheel disposed on the second light path, wherein the first color wheel is a scattering color wheel which scatters the first light beam and outputs the scattered first light beam, and wherein the second color wheel is a color wheel carrying a wavelength conversion material which, when illuminated by the second light beam, generates a light having a color complementary to the first light beam; or wherein the at least two concentric color rings include a first color ring disposed on the first light path and a second color ring disposed on the second light path, wherein the first color ring has a scattering layer which scatters the first light beam and outputs the scattered first light beam, and wherein the second color ring carries a wavelength conversion material which, when illuminated by the second light beam, generates a light having a color complementary to the first light beam.

Preferably, the light modulation system includes one light modulator, and wherein the switching system includes:

a first light switch for switching the light emitted by the light source into a first light beam during a first series of time intervals and switching the light emitted by the light source into a second light beam during a second series of time intervals, wherein the first light beam and the second light beam have different polarization states;

a second light switch for switching the second light beam into a third light beam during a first series of sub-intervals of the second time intervals and switching the second light beam into a fourth light beam during a second series of sub-intervals of the second time intervals, wherein the third light beam and the fourth light beam have different polarization states;

a controller for controlling a duration of the first light beam and a duration of the second light beam, and for controlling a duration of the third light beam and a duration of the fourth light beam, wherein a ratio of the duration of the first light beam and the duration of the second light beam is a first preset ratio, and a ratio of the duration of the third light beam and the duration of the fourth light beam is a second preset ratio, and wherein the controller is configured to adjust the first and second preset ratios based on parameters of the projection image.

Preferably, the light modulation system includes three light modulators, and wherein the switching system includes:

a first light switch for switching the light emitted by the light source into a light that simultaneously includes both a first light beam and a second light beam, wherein the first light beam and the second light beam have different polarization states;

a second light switch for switching the second light into a light that simultaneously includes both a third light beam and a fourth light beam, wherein the third light beam and the fourth light beam have different polarization states;

a controller for controlling a deflection angle of the first light switch and controlling a deflection angle of the second light switch, wherein a ratio of an intensity of the first light beam and an intensity of the second light beam is a first preset ratio and a ratio of an intensity of the third light beam and an intensity of the fourth light beam is a second preset ratio, and wherein the controller is configured to adjust the first and second preset ratios based on parameters of the projection image.

Preferably, the switching system further includes:

a first beam splitting prism for reflecting the first light beam to a first light path and transmitting the second light beam;

a second beam splitting prism for reflecting the third light beam to a second light path and transmitting the fourth light beam; and a reflector for reflecting the fourth light beam to a third light path.

Preferably, the at least two color wheels include a first color wheel disposed on the first light path, a second color wheel disposed on the second light path, and a third color wheel disposed on the third light path, wherein the first color wheel is a scattering color wheel which scatters the first light beam and outputs the scattered first light beam, wherein the second color wheel is a color wheel carrying a first wavelength conversion material which, when illuminated by the third light beam, generates a first color light, and wherein the third color wheel is a color wheel carrying a second wavelength conversion material which, when illuminated by the fourth light beam, generates a second color light; or wherein the at least two concentric color rings include a first color ring disposed on the first light path, a second color ring disposed on the second light path, and a third color ring disposed on the third light path, wherein the first color ring has a scattering layer which scatters the first light beam and outputs the scattered first light beam, wherein the second color ring carries a first wavelength conversion material which, when illuminated by the third light beam, generates a first color light, and wherein the third color ring carries a second wavelength conversion material which, when illuminated by the fourth light beam, generates a second color light; and wherein the scattered first light beam, the first color light and the second color light are configured to be modulated by the light modulation system and combined to form a projection image.

The present invention provides a projection system, which includes:

the light source system described above;

a light modulation system for modulating different color lights generated by the light source system and combining the modulated color lights to form a projection image; and a photodetector for detecting parameters of the projection image and feeding the detected parameters back to the light source system, wherein the light source system adjusts proportions of the different color lights based on the parameters.

Preferably, the parameters of the projecting image include brightness and color coordinates of the different color lights.

Preferably, the projection system further includes:

a light combination system disposed between the light source system and the light modulation system, including a reflector and at least one dichroic mirror respectively disposed on output paths of different color lights for reflecting the different color lights to the light modulation system.

Preferably, the light source system includes a light switch for switching the light emitted by the light source into a first and a second light beam and a controller for controlling the light switch to control durations of the first and the second light beam, and wherein the light modulation system includes:

a beam splitting and combination prism, for transmitting the first light beam to the first light modulator, splitting the second light beam into a first color light and a second color light, the second light beam having a color complementary to the first light beam, transmitting the first color light to the first light modulator, and transmitting the second color light to the second light modulator;

wherein the first light modulator sequentially modulates the first light beam and the first color light, and the second light modulator modulates the second color light.

Preferably, the switching system includes a light switch for switching the light emitted by the light source into a first light beam and a second light beam and a controller for controlling a deflection angle of the light switch, and wherein the light modulation system includes:

a beam splitting and combination prism, for transmitting the first light beam to the first light modulator, splitting the second light beam into a first color light and a second color light, the second light beam having a color complementary to the first light beam, transmitting the first color light to the second light modulator, and transmitting the second color light to the third light modulator;

wherein the first light modulator modulates the first light beam, the second light modulator modulates the first color light, and the third light modulator modulates the second color light.

Preferably, the switching system includes a first light switch and a second light switch which together switch the light emitted by the light source into a sequence of a first light beam, a first color light and a second color light, and a controller for controlling the first and the second light switch to control durations of the first light beam, the first color light and the second color light, and wherein the light modulation system includes:

a beam splitting and combination prism, for sequentially transmitting the first light beam, the first color light and the second color light to the light modulator;

wherein the light modulator sequentially modulates the first light beam, the first color light and the second color light.

Preferably, the switching system includes a first light switch and a second light switch which together switch the light emitted by the light source into a first light beam, a first color light and a second color light, and a controller for controlling deflection angles of the first and second light switches, and wherein the light modulation system includes:

a beam splitting and combination prism, for transmitting the first light beam to the first light modulator, transmitting the first color light to the second light modulator, and transmitting the second color light to the third light modulator;

wherein the first light modulator modulates the first light beam, the second light modulator modulates the first color light, and the third light modulator modulates the second color light.

Advantages of the Invention

Compared to conventional technologies, embodiments of the present invention have the following advantages:

In the light source system and projection system of the present embodiments, because the switching system switches the light emitted by the light source into at least two light beams of preset proportions based on time division or light intensity division, and at least two color wheels disposed on different light paths of the at least two light beams are used to generate different color lights of preset proportions, the proportions of the different color lights can be adjusted by adjusting the duration ratio or the intensity ratio of the first light beam and the second light beam, in order to control the white balance of the projected image. Thus, when the projection images exhibits white balance drift, the switching system can be used to adjust the proportions of the different color lights to re-establish the proper white balance, without having to replace the color wheels. Thus, the associated problems of high cost and operation difficulty are solved.

BRIEF DESCRIPTION OF THE DRAWINGS

To more clearly describe the embodiments of the present invention, the following drawings are used. These drawings are only exemplary; those skilled in the art will be able to construct other drawings based on the following drawings without creative work.

DETAILED DESCRIPTION OF PREFERRED EMBODIMENTS

Embodiments of the present invention are described below with reference to the drawings. These embodiments are some but not all embodiments of the invention. Based on the descriptions below, those skilled in the art may construct other embodiments without creative work, and such embodiment are within the scope of the present invention.

First Embodiment

Figure 1:
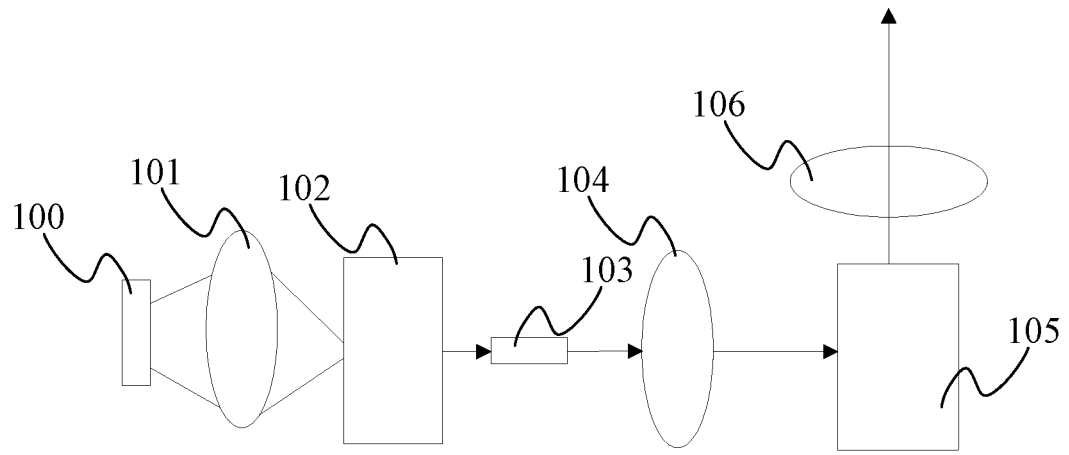
FIG. 1 schematically illustrates the structure of a conventional projection system.
Figure 2:
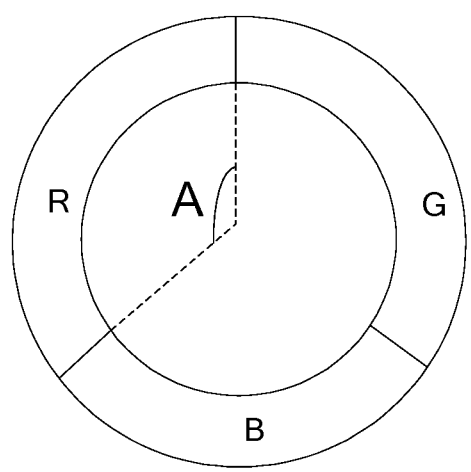
FIG. 2 schematically illustrates the structure of a phosphor color wheel used in the conventional projection system.
Figure 3:
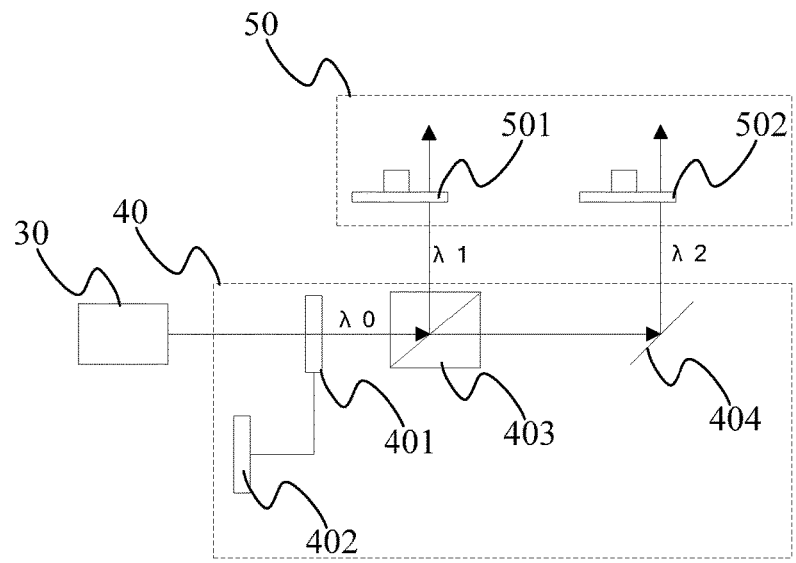
FIG. 3 schematically illustrates the structure of a light source system according to a first embodiment of the present invention.

This embodiment provides a light source system, as shown in FIG. 3, which includes a light source 30, a switching system 40 which switches the light emitted by the light source 30 into at least two light beams having preset proportions using time division, and a color wheel assembly 50 disposed on the transmission paths of the at least two light beams. The color wheel assembly 50, when illuminated by each of the at least two light beams, generates lights of different colors having preset proportions, and the lights of different colors can be modulated by a light modulation system and combined into a projection image.

The light source 30 is a laser module that emits a blue light. The laser module may include one or more semiconductor lasers.

The switching system 40 includes a light switch 401, a controller 402, a beam splitting prism 403 and a reflector 404. The light switch 401 switches the light $\lambda 0$ emitted by the light source 30 into a first light beam $\lambda 1$ during a first series of time intervals, and switches the light λ0 emitted by the light source 30 into a second light beam λ2 during a second series of time intervals. The light switch 401 may be an electro-optical device such as a liquid crystal phase retarder, or a magneto-optical device, or an acousto-optic device.

The controller 402 controls the time durations of the first light beam λ1 and the second light beam λ2 outputted by the light switch 401, so that the first light beam λ1 and the second light beam λ2 have a preset ratio of time durations. The controller 402 can adjust the time duration ratio of the first light beam λ1 and the second light beam λ2 based on parameters of the image being projected. The parameters of the image may include the brightness and color coordinates of the different color lights that form the image. The beam splitting prism 403 is a polarizing beam splitting prism, which reflects the first light beam λ1 to a first light path and transmits the second light beam λ2. The reflector 404 reflects the second light beam λ2 to a second light path.

The color wheel assembly 50 includes at least two color wheels, which are respectively disposed on the light paths of the different light beams generated by the switching system 40, and generate different color lights under the illumination of the respective light beams. For example, the color wheel assembly 50 includes a first color wheel 501 disposed on the first light path and a second color wheel 502 disposed on the second light path. The first color wheel 501 is a scattering color wheel, which scatters the first light beam λ1 and outputs the scattered first light beam λ1. The second color wheel 502 is a color wheel carrying a wavelength conversion material such as a yellow phosphor material which, when illuminated by the second light beam λ2, generates a light complementary in color to the first light beam λ1, such as a yellow light.

Or, in another embodiment, the color wheel assembly includes a single color wheel, which has at least two concentric color rings disposed in a circumferential direction of the color wheel. The color rings are respectively disposed on the different light paths of the different light beams generated by the switching system, and generate different color lights under the illumination of the respective light beams. For example, the at least two color rings include a first color ring disposed on the first light path and a second color ring disposed on the second light path. The first color ring has a scattering layer, which scatters the first light beam and outputs the scattered first light beam. The scattering layer may be a layer of optical materials having a diffusion effect, such as a scattering powder, or the scattering layer may be formed by an optical processing such as roughening of the surface of the color wheel. The second color ring carries a wavelength conversion material such as a yellow phosphor material which, when illuminated by the second light beam, generates a light complementary in color to the first light beam, such as a yellow light.

In this embodiment, the controller 402 controls the duration of the first time intervals $T_B$ and the duration of the second time intervals $T_Y$, so that the duration ratio of the first light beam λ1 and the second light beam λ2 is a preset ratio, i.e. $T_B:T_Y$, and the sum of the durations of the first time intervals $T_B$ and second time intervals $T_Y$ (within a frame period) is the period T of a frame of image.

Under the control of the controller 402, the light switch 401 switches the light λ0 emitted by the light source 30 into the first light beam λ1 during the first time intervals $T_B$, and switches the light λ0 emitted by the light source 30 into the second light beam λ2 during the second time intervals $T_Y$. Assuming that the light λ0 emitted by the light source 30 is an S-polarized blue light, then the first light beam λ1 outputted by the light switch 401 is still an S-polarized blue light, and the second light beam λ2 outputted by the light switch 401 is a P-polarized blue light; the time-averaged intensity ratio of the S-polarized blue light and the P-polarized blue light is $T_B:T_Y$.

The beam splitting prism 403 transmits the second light beam λ2 i.e. the P-polarized blue light, and reflects the first light beam λ1 i.e. the S-polarized blue light to the first color wheel 501 located on the first light path. Because the first color wheel 501 is a pure color wheel with scattering materials, it can transmit the blue light and can depolarize the S-polarized blue light before outputting it. The reflector 404 reflects the second light beam λ2 i.e. the P-polarized blue light that has transmitted through the beam splitting prism 403 to the second color wheel 502 located on the second light path. Because the second color wheel 502 is a color wheel carrying yellow phosphor, it can absorb the blue light and generate a yellow light, i.e. it generates a yellow light which has a color complementary to the blue light. The ratio of the blue and yellow lights is $T_B:T_Y$. Because blue light and yellow light can be combined to form a white light, the output lights of this system can be combined by downstream light combining optics and used to form color images. In this embodiment, a spatial light modulation system including two spatial light modulators can be used to modulate the blue light and the yellow light.

In another embodiment, the light switch 401 switches the light beam λ0 emitted by the light source 30 into a light that simultaneously includes both the first light beam λ1 and the second light beam λ2. The controller 402 controls the deflection angle of the light switch 401 so that the first light beam λ1 and the second light beam λ2 have a preset intensity ratio. The controller 402 can adjust the intensity ratio of the first light beam λ1 and the second light beam λ2 based on the parameters of the image being projected.

Assuming that the deflection angle of the light switch 401 is α, the intensity of the light from the light source is I, and the angle α is between 0 and 90 degrees, then the output light of the light switch 401 includes both the first light beam λ1 i.e. an S-polarized blue light and the second light beam λ2 i.e. a P-polarized blue light. The intensity of the S-polarized blue light is $I\cos^2\alpha$ and the intensity of the P-polarized blue light is $I\sin^2\alpha$. It can be seen that the intensity ratio of the S-polarized blue light and the P-polarized blue light is $\cos^2\alpha/\sin^2\alpha$, i.e., the first light beam λ1 and the second light beam λ2 have a preset intensity ratio of $\cos^2\alpha/\sin^2\alpha$.

The beam splitting prism 403 transmits the P-polarized blue light, and reflects the S-polarized blue light to the first color wheel 501 located on the first light path. Because the first color wheel 501 is a pure color wheel with scattering materials, it can transmit the blue light and can depolarize the S-polarized blue light before outputting it. The reflector 404 reflects the P-polarized blue light that has transmitted through the beam splitting prism 403 to the second color wheel 502 located on the second light path. Because the second color wheel 502 is a color wheel carrying yellow phosphor, it can absorb the blue light and generate a complementary yellow light. The ratio of the blue and yellow lights is $\cos^2\alpha/\sin^2\alpha$. Because blue light and yellow light can be combined to form a white light, the output lights of this system can be combined by downstream light combining optics and used to form color images. In this embodiment, a spatial light modulation system including three spatial light modulators may be used to modulate the blue light and the yellow light.

In the light source system according to this embodiment, because the switching system switches the light emitted by the light source into at least two light beams of preset proportions based on time division or light intensity division, and at least two color wheels disposed on different light paths of the at least two light beams are used to generate different color lights of preset proportions, the proportions of the different color lights can be adjusted by adjusting the duration ratio or the intensity ratio of the first light beam and the second light beam, in order to control the white balance of the projected image. Thus, the color wheels do not need to be replaced, and the associated problems of high cost and operation difficulty are solved.

Second Embodiment

Figure 4:
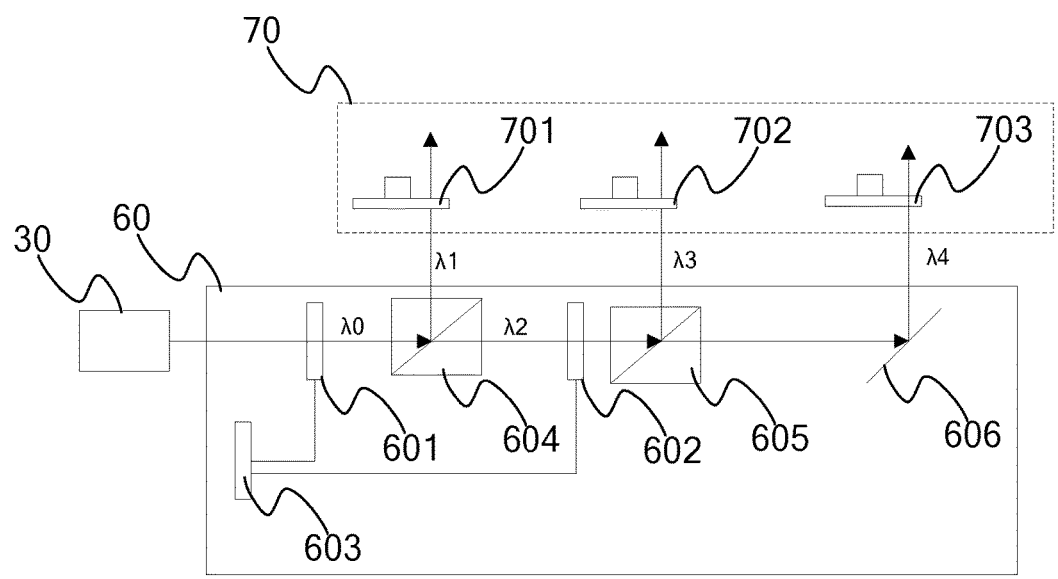
FIG. 4 schematically illustrates the structure of a light source system according to a second embodiment of the present invention.

This embodiment provides a light source system as shown in FIG. 4; different from the light source system of the first embodiment, in this embodiment, the switching system 60 includes a first light switch 601, a second light switch 602, a controller 603, a first beam splitting prism 604, a second beam splitting prism 605, and a reflector 606, where the first beam splitting prism 604 and the second beam splitting prism 605 are both polarizing beam splitting prisms.

The first light switch 601 switches the light $\lambda 0$ emitted by the light source 30 into a first light beam $\lambda 1$ during a first series of time intervals $T_B$, and switches the light $\lambda 0$ emitted by the light source 30 into a second light beam $\lambda 2$ during a second series of time intervals $T_Y$. The first light beam $\lambda 1$ and the second light beam $\lambda 2$ are lights of different polarization states. The duration ratio of the first light beam $\lambda 1$ and the second light beam $\lambda 2$ is a preset ratio, i.e. $T_B:T_Y$, and the sum of the durations of the first time intervals $T_B$ and second time intervals $T_Y$ (within a frame) is the period T of the frame of image. The second light switch 602 switches the second light beam $\lambda 2$ into a third light beam $\lambda 3$ during a first series of sub-intervals $T_G$ of the second time intervals $T_Y$, and switches the second light beam $\lambda 2$ into a fourth light beam $\lambda 4$ during a second series of sub-intervals $T_R$ of the second time intervals $T_Y$. The duration ratio of the third light beam $\lambda 3$ and the fourth light beam $\lambda 4$ is a preset ratio, i.e. $T_G:T_R$. The third light beam $\lambda 3$ and the fourth light beam $\lambda 4$ are lights of different polarization states. The first light switch 601 and the second light switch 602 may be electro-optical devices such as liquid crystal phase retarders, or magneto-optical devices, or acousto-optic devices.

The controller 603 controls the time durations of the first light beam $\lambda 1$ and the second light beam $\lambda 2$ outputted by the first light switch 601, so that the first light beam $\lambda 1$ and the second light beam $\lambda 2$ have a preset ratio of time durations. It also controls the time durations of the third light beam $\lambda 3$ and the fourth light beam $\lambda 4$ outputted by the second light switch 602, so that the third light beam $\lambda 3$ and the fourth light beam $\lambda 4$ have a preset ratio of time durations. The controller 603 can adjust the time duration ratio of the first light beam $\lambda 1$ and the second light beam $\lambda 2$ and the time duration ratio of the third light beam $\lambda 3$ and the fourth light beam $\lambda 4$ based on parameters of the image being projected.

The first beam splitting prism 604 reflects the first light beam $\lambda 1$ to a first light path and transmits the second light beam $\lambda 2$. The second beam splitting prism 605 reflects the third light beam $\lambda 3$ to a second light path and transmits the fourth light beam $\lambda 4$. The reflector 606 reflects the fourth light beam $\lambda 4$ to a third light path.

The color wheel assembly 70 includes a first color wheel 701 disposed on the first light path, a second color wheel 702 disposed on the second light path, and a third color wheel 702 disposed on the third light path. The first color wheel 701 is a scattering color wheel, which scatters the first light beam $\lambda 1$ and outputs the scattered first light beam $\lambda 1$. The second color wheel 702 is a color wheel carrying a first wavelength conversion material such as a green phosphor material which, when illuminated by the third light beam $\lambda 3$, generates a first color light such as a green light. The third color wheel 703 is a color wheel carrying a second wavelength conversion material such as a red phosphor material which, when illuminated by the fourth light beam $\lambda 4$, generates a second color light such as a red light.

Or, in another embodiment, the color wheel assembly 70 includes a single color wheel, which has at least two concentric color rings, such as a first color ring disposed on the first light path, a second color ring disposed on the second light path, and a third color ring disposed on the third light path. The first color ring has a scattering layer, which scatters the first light beam and outputs the scattered first light beam. The second color ring carries a first wavelength conversion material such as a green phosphor material which, when illuminated by the third light beam, generates the first color light such as the green light. The third color ring carries a second wavelength conversion material such as a red phosphor material which, when illuminated by the fourth light beam, generates the second color light such as the red light.

In this embodiment, assuming that the light $\lambda 0$ emitted by the light source 30 is an S-polarized blue light, then the first light beam $\lambda 1$ outputted by the first light switch 601 is still an S-polarized blue light, and second light beam $\lambda 2$ is a P-polarized blue light. During the first sub-intervals $T_G$, the second light beam $\lambda 2$ i.e. the P-polarized blue light has its polarization rotated by 90 degrees by the second light switch 602 to become the third light beam $\lambda 3$, i.e. an S-polarized blue light. During the second sub-intervals $T_R$, the second light beam $\lambda 2$ i.e. the P-polarized blue light remains a P-polarized blue light after passing through the second light switch 602 to become the fourth light beam $\lambda 4$.

The first beam splitting prism 604 transmits the second light beam $\lambda 2$ i.e. the P-polarized blue light, and reflects the first light beam $\lambda 1$ i.e. the S-polarized blue light to the first color wheel 701 located on the first light path. Because the first color wheel 701 is a pure color wheel with scattering materials, it can transmit the blue light and can depolarize the S-polarized blue light before outputting it. The second beam splitting prism 605 transmits the fourth light beam $\lambda 4$ i.e. the P-polarized blue light, and reflects the third light beam $\lambda 3$ i.e. the S-polarized blue light to the second color wheel 702 located on the second light path. Because the second color wheel 702 is a color wheel carrying green phosphor, it can absorb the blue light and generate the first color light, i.e. the green light. The reflector 606 reflects the fourth light beam $\lambda 4$ i.e. the P-polarized blue light that has transmitted through the second beam splitting prism 605 to the third color wheel 703 located on the third light path. Because the third color wheel 702 is a color wheel carrying red phosphor, it can absorb the blue light and generate the second color light, i.e. the red light. The ratio of the blue, green and red lights is $T_B:T_G:T_R$, and the sum of the durations of the time intervals $T_B$, $T_G$ and $T_R$ (within a period) is the period T of a frame of image. Because blue, green and red lights can be combined to form a white light, the output lights of this system can be combined by downstream light combining optics and used to form color images. In this embodiment, a spatial light modulation system including one spatial light modulator may be used to modulate the blue, green and red lights.

In another embodiment, the first light switch 601 switches the light beam λ0 emitted by the light source 30 into a light that simultaneously includes both the first light beam λ1 and the second light beam λ2, and the second light switch 602 switches the second light beam λ2 into a light that simultaneously includes both the third light beam λ3 and the fourth light beam λ4. The controller 602 controls the deflection angle of the first light switch 601 so that the first light beam λ1 and the second light beam λ2 have a preset intensity ratio, and controls the deflection angle of the second light switch 602 so that the third light beam λ3 and the fourth light beam λ4 have a preset intensity ratio. The controller 603 can adjust the intensity ratio of the first light beam λ1 and the second light beam λ2 and the intensity ratio of the third light beam λ3 and the fourth light beam λ4 based on the parameters of the image being projected.

Assuming that the deflection angle of the first light switch 601 is α, which is between 0 and 90 degrees, then the output light of the first light switch 601 includes both the S-polarized light and the P-polarized light, and the intensity ratio of the S-polarized light and the P-polarized light is $\cos^2 \alpha/\sin^2 \alpha$, i.e., the intensity ratio of the first light beam λ1 and the second light beam λ2 is $\cos^2 \alpha/\sin^2 \alpha$.

Assuming that the deflection angle of the second light switch 602 is β, because the intensity of the second light beam λ2 is $I \sin^2 \alpha$, the intensity of the S-polarized light output by the second light switch 602 is $I \sin^2\alpha \sin^2 \beta$, and the intensity of the P-polarized light is $I \sin^2\alpha \cos^2 \beta$. Thus, the intensity ratio of the S-polarized light and the P-polarized light is $\sin^2\alpha \sin^2 \beta : \sin^2 \alpha \cos^2 \beta$, i.e., the intensity ratio of the third light beam λ3 and the fourth light beam λ4 is $\sin^2 \alpha \sin^2 \beta : \sin^2\alpha \cos^2 \beta$.

In other words, under control of the controller 603, the first light switch 601 switches the first light beam λ1 emitted by the light source 30 into the first light beam λ1 i.e. S-polarized blue light and the second light beam λ2 i.e. P-polarized blue light; under control of the controller 603, the second light switch 602 switches the second light beam λ2 into the third light beam λ3 i.e. S-polarized blue light and the fourth light beam λ4 i.e. P-polarized blue light.

The first beam splitting prism 604 transmits the second light beam λ2 i.e. P-polarized blue light and reflects the first light beam λ1 i.e. S-polarized blue light to the first color wheel 701 located on the first light path. Because the first color wheel 701 is a pure color wheel with scattering materials, it can transmit the blue light and can depolarize the S-polarized blue light before outputting it. The second beam splitting prism 605 transmits the fourth light beam λ4 i.e. P-polarized blue light and reflects the third light beam λ3 i.e. S-polarized blue light to the second color wheel 702 located on the second light path. Because the second color wheel 702 is a color wheel carrying green phosphor, it can absorb the blue light and generate the first color light, i.e. the green light. The reflector 606 reflects the fourth light beam λ4 i.e. the P-polarized blue light that has transmitted through the second beam splitting prism 605 to the third color wheel 703 located on the third light path. Because the third color wheel 703 is a color wheel carrying red phosphor, it can absorb the blue light and generate the second color light, i.e. the red light. The ratio of the blue, green and red lights is $\cos^2 \alpha : \sin^2\alpha \sin^2 \beta : \sin^2\alpha \cos^2\beta$. Because blue, green and red lights can be combined to form a white light, the output lights of this system can be combined by downstream light combining optics and used to form color images. In this embodiment, a spatial light modulation system including three spatial light modulators may be used to modulate the blue, green and red lights.

In the light source system according to this embodiment, because the switching system switches the light emitted by the light source into at least two light beams of preset proportions based on time division or light intensity division, and at least two color wheels disposed on different light paths of the different light beams are used to generate different color lights of preset proportions, the proportion of the different color lights can be adjusted by adjusting the ratio of the switched light beams, in order to control the white balance of the projected image. Thus, the color wheels do not need to be replaced, and the associated problems of high cost and operation difficulty are solved.

Third Embodiment

This embodiment provides a projection system, which includes the light source system of the first embodiment, i.e., including the light source 30, the switching system 40 and the color wheel assembly 50. The switching system 40 includes the light switch 401, the controller 402, the beam splitting prism 403 and the reflector 404. The color wheel assembly 50 includes the first color wheel 501 and the second color wheel 502, where the first color wheel 501 is a pure color wheel with scattering materials, and the second color wheel 502 is a color wheel carrying yellow phosphor.

In addition, the projection system of this embodiment includes a light combination system, a light modulation system and a photodetector. The light combination system is disposed between the light source system and the light modulation system; the light combination system includes at least two reflectors which are disposed on the output light paths of the different color light beams, to reflect the respective color light to the light modulation system. The light modulation system modulates the different color lights, and combines the modulated color lights to form the projected image. The photodetector is used to detect the parameters of the projected image, and feed the parameters back to the light source system, so that the light source system can adjust the proportions of the different color lights. The parameters include the brightness and color coordinates of the different color lights that collectively form the projected image.

Figure 5:
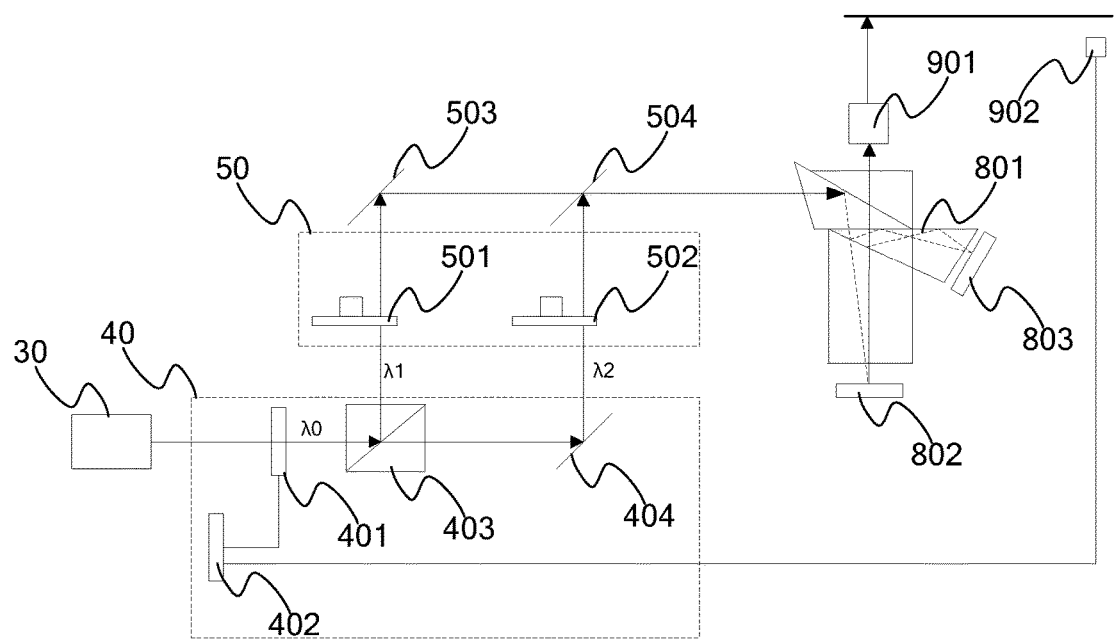
FIG. 5 schematically illustrates the structure of a projection system according to a third embodiment of the present invention.

In this embodiment, when the controller 402 of the light source system controls the light switch 401 by controlling the durations of the output light beams, the light modulation system includes a beam splitting and combination prism 801, a first light modulator 802 and a second light modulator 803. As shown in FIG. 5, the light combination system includes a reflector 503 and a dichroic mirror 504. The reflector 503 reflects the first light beam i.e. the blue light scattered by the first color wheel 501 to the beam splitting and combination prism 801; the dichroic mirror 504 transmits blue light and reflects the complementary yellow light generated by the second color wheel 502 to the beam splitting and combination prism 801. The dichroic mirror 504 is a mirror that transmits blue light and reflects yellow light.

Figure 6:
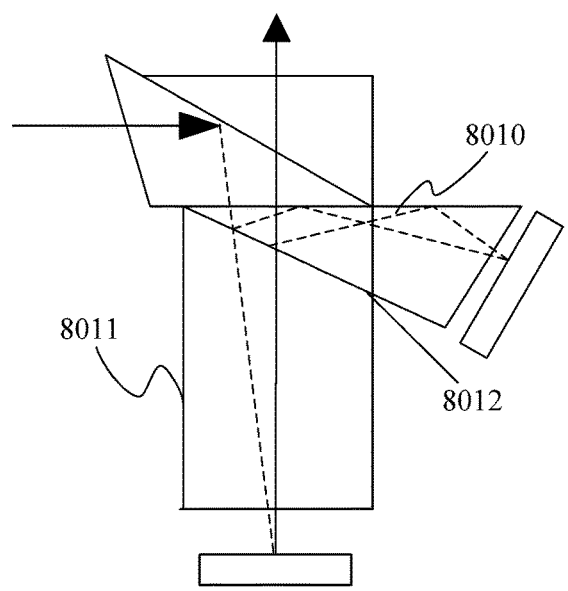
FIG. 6 schematically illustrates a beam splitting and combination prism used in the projection system of the third embodiment.

The beam splitting and combination prism 801 transmits the blue light to the first light modulator 802, separates the yellow light into a first color light i.e., a green light and a second color light i.e., a red light, transmits the green light to the first light modulator 802, and transmits the red light to the second light modulator 803. As shown in FIG. 6, the beam splitting and combination prism 801 includes a first prism 8010, a second prism 8011 and a light separation coating 8012 located between the first prism 8010 and the second prism 8011, where the light separation coating 8012 separates the yellow light into the red light and the green light.

Because the blue light and the yellow light are present in different time intervals, only two light modulators are needed to modulate the blue, green and red lights, i.e.: the first light modulator 802 sequentially modulates the blue light and green light, and the second light modulator 803 modulates the red light. Thus, blue, green and red lights are combined to form a projected image, which is projected onto a desired screen by the projection lens 901.

Figure 7:
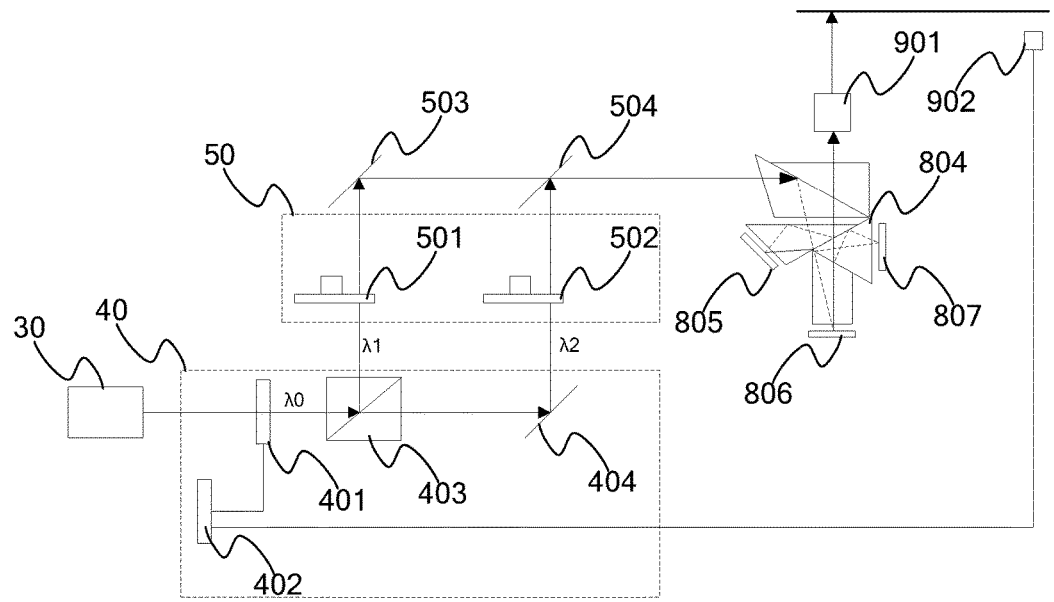
FIG. 7 schematically illustrates the structure of another projection system according to the third embodiment of the present invention.

When the controller 402 of the light source system controls the light switch 401 by controlling the deflection angle, the light modulation system includes a beam splitting and combination prism 804, a first light modulator 805, a second light modulator 806 and a third light modulator 807. As shown in FIG. 7, the light combination system includes a reflector 503 and a dichroic mirror 504. The reflector 503 reflects the first light beam i.e. the blue light scattered by the first color wheel 501 to the beam splitting and combination prism 804, and the dichroic mirror 504 transmits the blue light and reflects the complementary yellow light generated by the second color wheel 502 to the beam splitting and combination prism 804. The dichroic mirror 504 is a mirror that transmits blue light and reflects yellow light.

The beam splitting and combination prism 804 transmits the blue light to the first light modulator 805, separates the yellow light into a first color light i.e. a green light and a second color light i.e. a red light, transmits the green light to the second light modulator 806, and transmits the red light to the third light modulator 807. The beam splitting and combination prism 804 includes a first prism, a second prism and a third prism, as well as a light filtering coating located between the first prism and the second prism. The light filtering coating reflects blue light and transmits yellow light, to reflect the blue light to the first light modulator 805 and transmits the yellow light to a light separation coating located between the second prism and the third prism, where the light separation coating separates the yellow light into a red light and a green light.

Because the scattered first light and the complementary light are present simultaneously, three light modulators are needed to modulate the first light, the first color light and the second color light, i.e.: the first light modulator 805 modulates the first light, the second light modulator 806 modulates the first color light, and the third light modulator 807 modulates the second color light. Thus, the modulated blue, green and red lights are combined to form a projected image, which is projected onto a desired screen by the projection lens 901.

During projection operation, the photodetector 902 positioned in front of the screen can detect the parameters of the projected image, and feed the parameters back to the light source system, so that the light source system can adjust the proportions of the different color lights. The parameters include the brightness and color coordinates of the different color lights that collectively form the projected image. More specifically, after the photodetector 902 detects the brightness and color coordinates of projected image, the parameters are transmitted to the controller 402 of the light source system, and the controller 402 uses these parameters to determine whether the image is properly white balanced. If the white balance exhibits a shift, the controller 402 adjusts the durations of the first time intervals $T_B$ and the second time intervals $T_Y$, or adjusts the deflection angle α, thereby adjusting the proportions of the blue, green and red lights to re-establish a proper white balance of the projected image.

In the projection system according to this embodiment, because the switching system switches the light emitted by the light source into at least two light beams of preset proportions based on time division or light intensity division, and at least two color wheels disposed on different light paths of the at least two light beams are used to generate different color lights of preset proportions, the proportions of the different color lights can be adjusted by adjusting the duration ratio or the intensity ratio of the switched light beams, in order to control the white balance of the projected image. Thus, the color wheels do not need to be replaced, and the associated problems of high cost and operation difficulty are solved.

Moreover, the projection system of this embodiment can use the photodetector to automatically detect the white balance of the projected image, and use the controller to automatically adjust the proportions of the different color lights, so that the white balance of the projection system can be ensured in a flexible and efficient way.

Fourth Embodiment

This embodiment provides a projection system, which includes the light source system of the second embodiment, i.e., including the light source 30, the switching system 60 and the color wheel assembly 70. The switching system 60 includes the first light switch 601, the second light switch 602, the controller 603, the first beam splitting prism 604, the second beam splitting prism 605, and the reflector 606. The color wheel assembly 70 includes the first color wheel 701, the second color wheel 702 and the third color wheel 703, where the first color wheel 701 is a pure color wheel with scattering materials, the second color wheel 702 is a color wheel carrying green phosphor, and the third color wheel 703 is a color wheel carrying red phosphor.

In addition, the projection system of this embodiment includes a light combination system, a light modulation system and a photodetector. The light combination system is disposed between the light source system and the light modulation system, and includes at least two reflectors which are disposed on the output light paths of the different color light beams, to reflect the respective color lights to the light modulation system. The light modulation system modulates the different color lights, and combines the modulated color lights to form the projected image. The photodetector is used to detect the parameters of the projected image and feed the parameters back to the light source system, so that the light source system can adjust the proportions of the different color lights. The parameters include the brightness and color coordinates of the different color lights that form the projected image.

Figure 8:
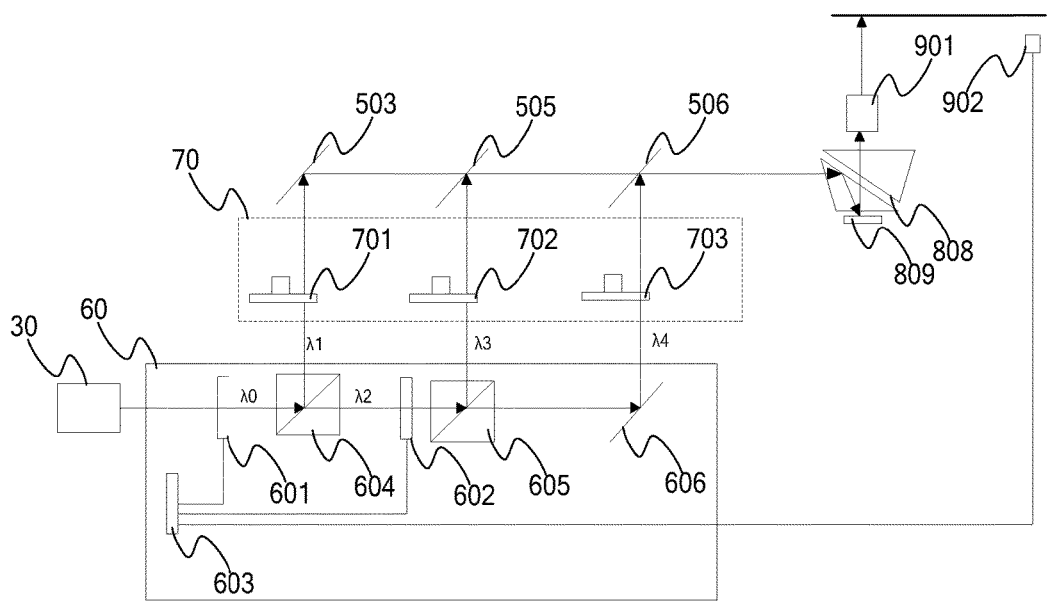
FIG. 8 schematically illustrates the structure of a projection system according to a fourth embodiment of the present invention.

In this embodiment, when the controller 603 of the light source system controls the light switches by controlling the durations of the output light beams, the light modulation system includes a beam splitting and combination prism 808 and a light modulator 809. As shown in FIG. 8, the light combination system includes a reflector 503, a dichroic mirror 505 and a dichroic mirror 506. The dichroic mirror 505 transmits blue light and reflects green light, and the dichroic mirror 506 transmits blue and green lights and reflects red light.

The reflector 503 reflects the first light beam i.e. the blue light scattered by the first color wheel 701 to the beam splitting and combination prism 808. The dichroic mirror 505 transmits blue light but reflects the first color light i.e. the green light generated by the second color wheel 702 to the beam splitting and combination prism 808. The dichroic mirror 506 transmits blue and green light and reflects the second color light i.e. the red light generated by the third color wheel 703 to the beam splitting and combination prism 808. In this embodiment, because there is no need to separate a yellow light, the beam splitting and combination prism 808 only includes two prisms with their inclined planes facing each other, to transmit the blue, green and red lights sequentially to the light modulator 809. The modulated blue, green and red lights are combined to form a projected image, which is projected onto a desired screen by the projection lens 901.

Figure 9:
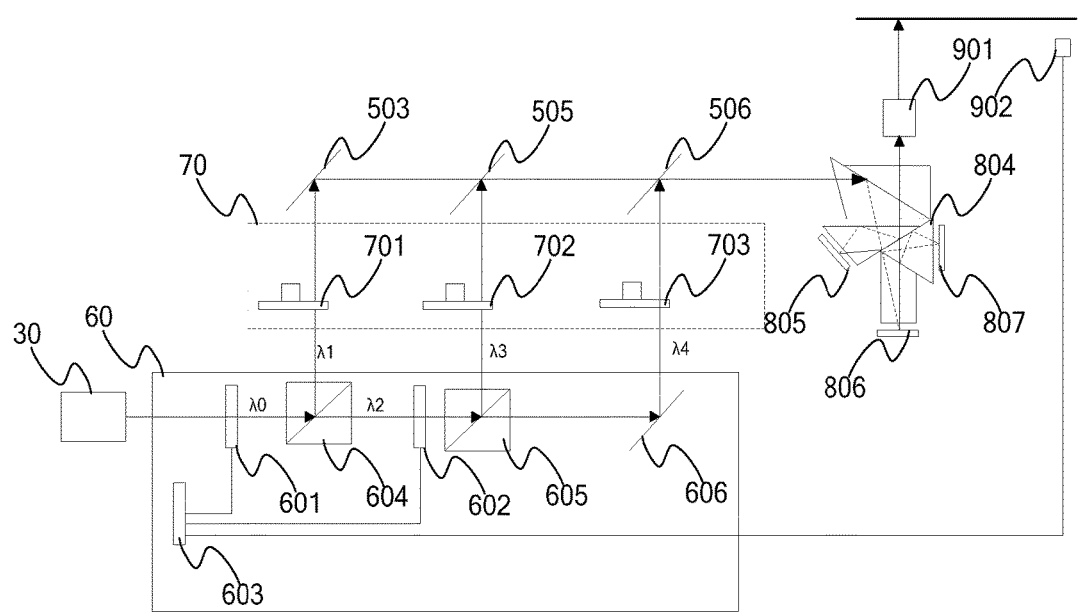
FIG. 9 schematically illustrates the structure of another projection system according to the fourth embodiment of the present invention.

When the controller 603 of the light source system controls the light switches by controlling the deflection angles, the light modulation system includes a beam splitting and combination prism 804, a first light modulator 805, a second light modulator 806 and a third light modulator 807. As shown in FIG. 9, the light combination system includes a reflector 503, a dichroic mirror 505 and a dichroic mirror 506. The reflector 503 reflects the first light beam i.e. the blue light scattered by the first color wheel 701 to the beam splitting and combination prism 804. The dichroic mirror 505 transmits blue light and reflects the first color light i.e. the green light generated by the second color wheel 702 to the beam splitting and combination prism 804. The dichroic mirror 506 transmits blue and green lights and reflects the second color light i.e. the red light generated by the third color wheel 703 to the beam splitting and combination prism 804. The beam splitting and combination prism 804 transmits the blue light to the first light modulator 805, transmits the green light to the second light modulator 806, and transmits the red light to the third light modulator 807. The modulated blue, green and red lights are combined to form a projected image, which is projected onto a desired screen by the projection lens 901.

During projection operation, the photodetector 902 positioned in front of the screen can detect the parameters of the projected image, and feed the parameters back to the light source system, so that the light source system can adjust the proportions of the different color lights. The parameters include the brightness and color coordinates of the different color lights that form the projected image.

More specifically, after the photodetector 902 detects the brightness and color coordinates of projected image, the parameters are transmitted to the controller 603 of the light source system, and the controller 603 uses these parameters to determine whether the image is properly white balanced. If the white balance exhibits a shift, the controller 603 adjusts the durations of the first time intervals $T_B$ and the second time intervals $T_r$, or adjusts the deflection angles α and β, thereby adjusting the proportions of the blue, green and red lights to re-establish a proper white balance of the projected image.

In the projection system of this embodiment, because the switching system switches the light emitted by the light source into at least two light beams of preset proportions based on time division or light intensity division, and at least two color wheels disposed on different light paths of the at least two light beams are used to generate different color lights of preset proportions, the proportion of the different color lights can be adjusted by adjusting the ratio of the switched light beams, in order to control the white balance of the projected image. Thus, the color wheels do not need to be replaced, and the associated problems of high cost and operation difficulty are solved.

Moreover, the projection system of this embodiment can use the photodetector to automatically detect the white balance of the projected image, and use the controller to automatically adjust the proportions of the different color lights, so that the white balance of the projection system can be ensured in a flexible and efficient way.

The various embodiments in this disclosure are described in a progressive manner, where each embodiment is explained by emphasizing its differences from other embodiments. The similar aspects of the various embodiments can be understood by cross reference to each other. Those skilled in the art may make and use the invention based on the above descriptions without undue experimentation. It will be apparent to those skilled in the art that various modification and variations can be made to the various embodiment of the present invention. The principles described in this disclosure may be achieved using other embodiments without departing from the spirit or scope of the invention. Thus, the invention is not limited by the illustrated embodiments. It is intended that the present invention cover modifications and variations that come within the scope of the appended claims and their equivalents.

What is claimed is:

1. A light source system, comprising:
   a light source;
   a switching system for switching a light emitted by the light source into at least two light beams having preset proportions using either time division or light intensity division; and
   a color wheel assembly disposed on light paths of the at least two light beams, wherein the color wheel assembly, under illumination of the at least two light beams, generates lights of different colors having preset proportions, wherein the light of different colors are configured to be modulated by a light modulation system and combined to form a projection image;
   wherein the switching system is configured to adjust proportions of the at least two light beams based on parameters obtained from the projection image to adjust the proportions of the lights of different colors;
   wherein the light modulation system includes three light modulators, and wherein the switching system comprises:
   a light switch for switching the light emitted by the light source into a light that simultaneously includes both a first light beam and a second light beam, wherein the first light beam and the second light beam have different polarization states;
   a controller for controlling a deflection angle of the light switch, wherein a ratio of an intensity of the first light beam and an intensity of the second light beam is a preset ratio, and wherein the controller is configured to adjust the preset ratio based on parameters of the projection image.

2. The light source system of claim 1, wherein the color wheel assembly comprises at least two color wheels, each being disposed on a light path of a different one of the at least two light beams from the switching system and generating a corresponding color light when illuminated by the corresponding light beam; or
   wherein the color wheel assembly comprises a single color wheel having at least two concentric color rings disposed in a circumferential direction of the color wheel, each color ring being disposed on a light path of a different one of the at least two light beams from the switching system and generating a corresponding color light when illuminated by the corresponding light beam.

3. The light source system of claim 1, wherein the switching system further comprises:

a beam splitting prism for reflecting the first light beam to a first light path and transmitting the second light beam; and a reflector for reflecting the second light beam to a second light path.

4. The light source system of claim 3, wherein the at least two color wheels include a first color wheel disposed on the first light path and a second color wheel disposed on the second light path, wherein the first color wheel is a scattering color wheel which scatters the first light beam and outputs the scattered first light beam, and wherein the second color wheel is a color wheel carrying a wavelength conversion material which, when illuminated by the second light beam, generates a light having a color complementary to the first light beam; or wherein the at least two concentric color rings include a first color ring disposed on the first light path and a second color ring disposed on the second light path, wherein the first color ring has a scattering layer which scatters the first light beam and outputs the scattered first light beam, and wherein the second color ring carries a wavelength conversion material which, when illuminated by the second light beam, generates a light having a color complementary to the first light beam.

5. A light source system, comprising:

a light source;

a switching system for switching a light emitted by the light source into at least two light beams having preset proportions using either time division or light intensity division; and a color wheel assembly disposed on light paths of the at least two light beams, wherein the color wheel assembly, under illumination of the at least two light beams, generates lights of different colors having preset proportions, wherein the light of different colors are configured to be modulated by a light modulation system and combined to form a projection image;

wherein the switching system is configured to adjust proportions of the at least two light beams based on parameters obtained from the projection image to adjust the proportions of the lights of different colors;

wherein the light modulation system includes three light modulators, and wherein the switching system comprises:

a first light switch for switching the light emitted by the light source into a light that simultaneously includes both a first light beam and a second light beam, wherein the first light beam and the second light beam have different polarization states;

a second light switch for switching the second light into a light that simultaneously includes both a third light beam and a fourth light beam, wherein the third light beam and the fourth light beam have different polarization states;

a controller for controlling a deflection angle of the first light switch and controlling a deflection angle of the second light switch, wherein a ratio of an intensity of the first light beam and an intensity of the second light beam is a first preset ratio and a ratio of an intensity of the third light beam and an intensity of the fourth light beam is a second preset ratio, and wherein the controller is configured to adjust the first and second preset ratios based on parameters of the projection image.

6. The light source system of claim 5, wherein the switching system further comprises:

a first beam splitting prism for reflecting the first light beam to a first light path and transmitting the second light beam;

a second beam splitting prism for reflecting the third light beam to a second light path and transmitting the fourth light beam; and a reflector for reflecting the fourth light beam to a third light path.

7. The light source system of claim 6, wherein the at least two color wheels include a first color wheel disposed on the first light path, a second color wheel disposed on the second light path, and a third color wheel disposed on the third light path, wherein the first color wheel is a scattering color wheel which scatters the first light beam and outputs the scattered first light beam, wherein the second color wheel is a color wheel carrying a first wavelength conversion material which, when illuminated by the third light beam, generates a first color light, and wherein the third color wheel is a color wheel carrying a second wavelength conversion material which, when illuminated by the fourth light beam, generates a second color light; or wherein the at least two concentric color rings include a first color ring disposed on the first light path, a second color ring disposed on the second light path, and a third color ring disposed on the third light path, wherein the first color ring has a scattering layer which scatters the first light beam and outputs the scattered first light beam, wherein the second color ring carries a first wavelength conversion material which, when illuminated by the third light beam, generates a first color light, and wherein the third color ring carries a second wavelength conversion material which, when illuminated by the fourth light beam, generates a second color light; and wherein the scattered first light beam, the first color light and the second color light are configured to be modulated by the light modulation system and combined to form a projection image.

8. The light source system of claim 5, wherein the color wheel assembly comprises at least two color wheels, each being disposed on a light path of a different one of the at least two light beams from the switching system and generating a corresponding color light when illuminated by the corresponding light beam; or wherein the color wheel assembly comprises a single color wheel having at least two concentric color rings disposed in a circumferential direction of the color wheel, each color ring being disposed on a light path of a different one of the at least two light beams from the switching system and generating a corresponding color light when illuminated by the corresponding light beam.

9. A projection system, comprising:

a light source system comprising:

a light source;

a switching system for switching a light emitted by the light source into at least two light beams having preset proportions using either time division or light intensity division; and a color wheel assembly disposed on light paths of the at least two light beams, wherein the color wheel assembly, under illumination of the at least two light beams, generates lights of different colors having preset proportions, wherein the light of different colors are configured to be modulated by a light modulation system and combined to form a projection image;

wherein the switching system is configured to adjust proportions of the at least two light beams based on parameters obtained from the projection image to adjust the proportions of the lights of different colors;

a light modulation system for modulating different color lights generated by the light source system and combining the modulated color lights to form a projection image;

a photodetector for detecting parameters of the projection image and feeding the detected parameters back to the light source system, wherein the light source system adjusts proportions of the different color lights based on the parameters;

wherein the parameters of the projecting image include brightness and color coordinates of the different color lights; and a light combination system disposed between the light source system and the light modulation system, including a reflector and at least one dichroic mirror respectively disposed on output paths of different color lights for reflecting the different color lights to the light modulation system;

wherein the switching system includes a light switch for switching the light emitted by the light source into a first light beam and a second light beam and a controller for controlling a deflection angle of the light switch, and wherein the light modulation system comprises:

a first light modulator;

a second light modulator;

a third light modulator; and a beam splitting and combination prism, for transmitting the first light beam to the first light modulator, splitting the second light beam into a first color light and a second color light, the second light beam having a color complementary to the first light beam, transmitting the first color light to the second light modulator, and transmitting the second color light to the third light modulator;

wherein the first light modulator modulates the first light beam, the second light modulator modulates the first color light, and the third light modulator modulates the second color light.

10. The projection system of claim 9, wherein the color wheel assembly comprises at least two color wheels, each being disposed on a light path of a different one of the at least two light beams from the switching system and generating a corresponding color light when illuminated by the corresponding light beam; or wherein the color wheel assembly comprises a single color wheel having at least two concentric color rings disposed in a circumferential direction of the color wheel, each color ring being disposed on a light path of a different one of the at least two light beams from the switching system and generating a corresponding color light when illuminated by the corresponding light beam.

11. A projection system, comprising:

a light source system comprising:

a light source;

a switching system for switching a light emitted by the light source into at least two light beams having preset proportions using either time division or light intensity division; and a color wheel assembly disposed on light paths of the at least two light beams, wherein the color wheel assembly, under illumination of the at least two light beams, generates lights of different colors having preset proportions, wherein the light of different colors are configured to be modulated by a light modulation system and combined to form a projection image;

wherein the switching system is configured to adjust proportions of the at least two light beams based on parameters obtained from the projection image to adjust the proportions of the lights of different colors;

a light modulation system for modulating different color lights generated by the light source system and combining the modulated color lights to form a projection image;

a photodetector for detecting parameters of the projection image and feeding the detected parameters back to the light source system, wherein the light source system adjusts proportions of the different color lights based on the parameters;

wherein the parameters of the projecting image include brightness and color coordinates of the different color lights; and a light combination system disposed between the light source system and the light modulation system, including a reflector and at least one dichroic mirror respectively disposed on output paths of different color lights for reflecting the different color lights to the light modulation system;

wherein the switching system includes a first light switch and a second light switch which together switch the light emitted by the light source into a first light beam, a first color light and a second color light, and a controller for controlling deflection angles of the first and second light switches, and wherein the light modulation system comprises:

a first light modulator;

a second light modulator;

a third light modulator; and a beam splitting and combination prism, for transmitting the first light beam to the first light modulator, transmitting the first color light to the second light modulator, and transmitting the second color light to the third light modulator;

wherein the first light modulator modulates the first light beam, the second light modulator modulates the first color light, and the third light modulator modulates the second color light.

12. The projection system of claim 11, wherein the color wheel assembly comprises at least two color wheels, each being disposed on a light path of a different one of the at least two light beams from the switching system and generating a corresponding color light when illuminated by the corresponding light beam; or wherein the color wheel assembly comprises a single color wheel having at least two concentric color rings disposed in a circumferential direction of the color wheel, each color ring being disposed on a light path of a different one of the at least two light beams from the switching system and generating a corresponding color light when illuminated by the corresponding light beam.

* * * * *